May 21, 1968     D. J. DERMODY     3,384,338
VARIABLE ORIFICE DEVICE
Filed April 6, 1965     2 Sheets-Sheet 1
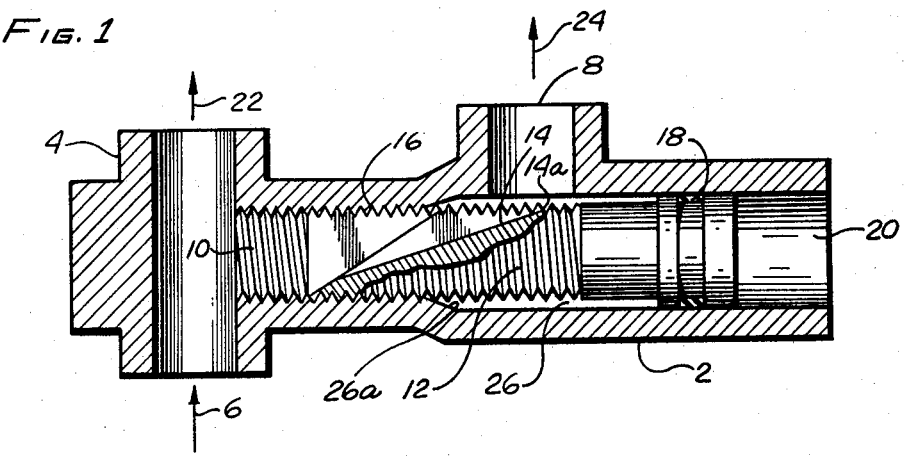
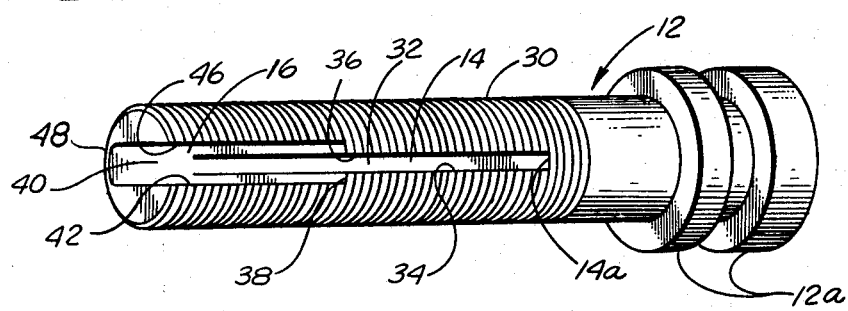
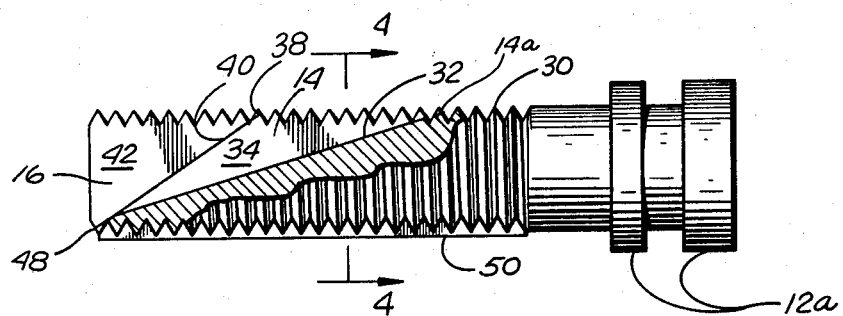
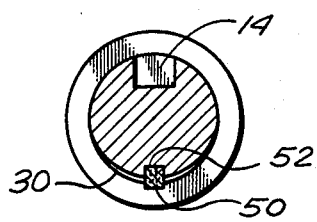
INVENTOR.
DENNIS J. DERMODY
BY
*Ronald W. Graves*
ATTORNEY May 21, 1968     D. J. DERMODY     3,384,338
VARIABLE ORIFICE DEVICE
Filed April 6, 1965     2 Sheets-Sheet 2
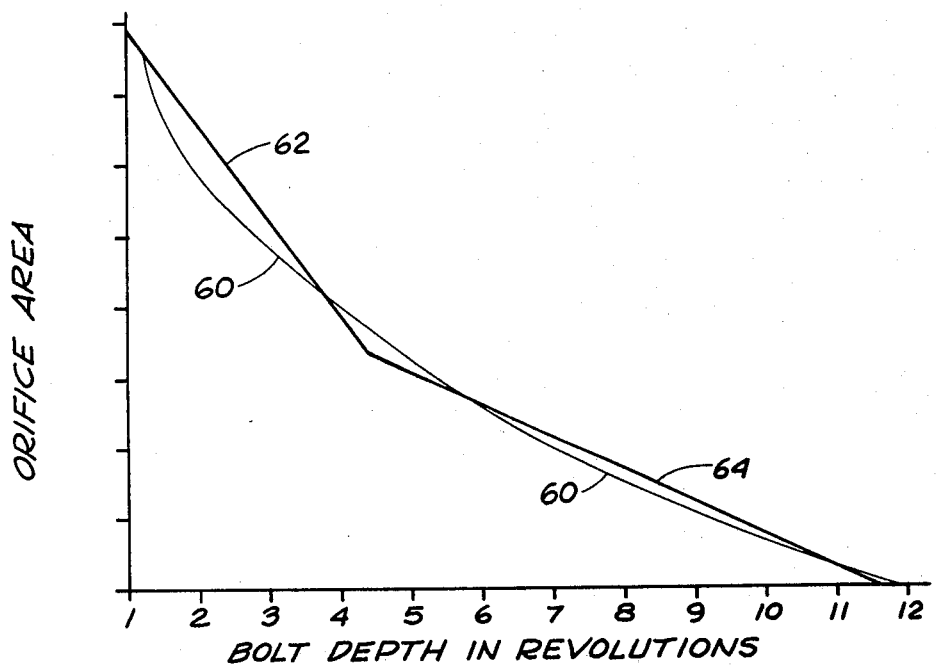
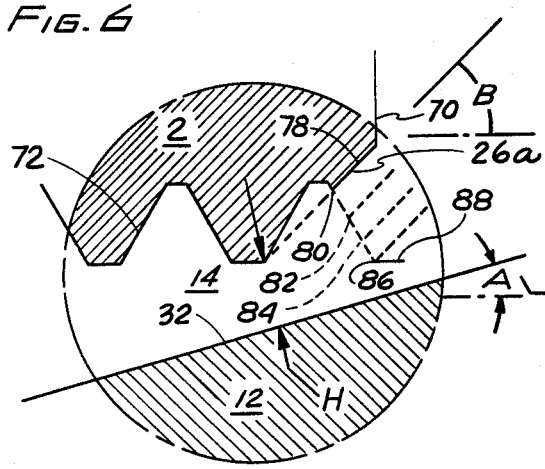
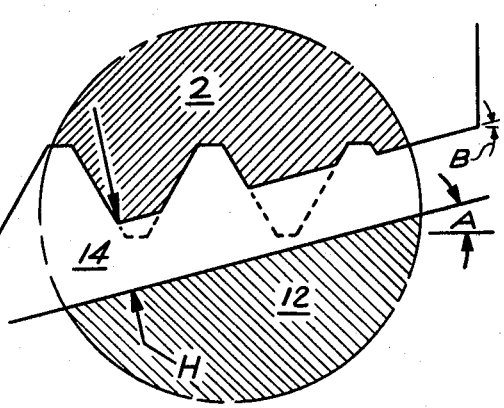
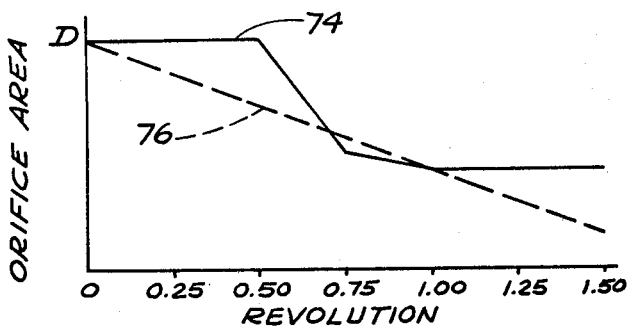
INVENTOR.
DENNIS J. DERMODY
BY
ATTORNEY

United States Patent Office 3,384,338
Patented May 21, 1968

3,384,338
VARIABLE ORIFICE DEVICE
Dennis J. Dermody, Canoga Park, Calif., assignor to North American Rockwell Corporation, a corporation of Delaware
Filed Apr. 6, 1965, Ser. No. 445,986
11 Claims. (Cl. 251—205)

ABSTRACT OF THE DISCLOSURE

A variable orifice device including a housing formed with a fluid passageway and an axially moveable elongated valve that is threadably interengaged with wall portions of the housing that define the fluid passageway. Plural slots inclined to the valve axis are formed in the valve and cooperate with the adjacent passageway wall to define a variable orifice through which fluid flow is substantially linear.

---

This invention relates to a variable orifice device.

More particularly, this invention relates to a device for varying the flow of fluid by a member which is rotatable within a passage and has at least one slot which controls the flow area through the passage.

There have been several approaches in the past to vary the flow of fluid through a line. One of these examples is the so-called "needle valve." This valve includes a member or needle movable in a passage with the needle having one end pointed so that upon movement toward a seat the annular passage around the needle will allow flow of fluid and as this passage decreases in cross-sectional area, the fluid flow is decreased. However, where precise control of the flow of fluid is necessary, the needle valve has disadvantages. For example, should there be any radial shifting of the needle point, this will result in the annular space between the housing and the valve to become "out of round." When the needle valve is in a given position, should the radial position of the needle shift completely to one side, the flow through the annular space will actually approach 2½ times the flow that occurs when the needle is precisely positioned in the center of the passage. In addition, flow through the annular orifice is unpredictable and non-repeatable because of even the slightest radial shift of the needle in relation to the seat.

Another approach utilizes the slot-piston ring such as disclosed in co-pending application, Ser. No. 166,452 filed Jan. 10, 1962 and assigned to the assignee of this application now Pat. No. 3,234,731. This type of structure eliminates the poppet or needle centering problem encountered in the needle valve type since the piston ring is always in contact with the housing due to its spring force and pressure distribution and the orifice is a rectangular slot in lieu of an extremely small annulus. This design is completely satisfactory for most applications, but when the flow area or orifice and passage become relatively small, the cost of making the valve is greater because of the piston rings and more important, the machining requirements of the bore and piston ring groove.

There are many other approaches to valving of flow in a line, but none of them solve the problems encountered in lines where precise flow is required, as does the instant invention.

Briefly, this invention comprises a housing having a threaded passageway and smooth bore portion through which fluid flow can pass with a threaded body member having at least one slot which is at an angle to the passageway so that upon moving the threaded body in the housing longitudinally of the passage, an orifice is formed by the slot and the housing which is varied according to movement. To provide linearity of flow throughout the range of the device, a second angled slot is provided. In addition, the countersink angle of the housing is kept equal to or less than the angle of the slot. Finally, there is an insert, which is self-tapping, provided on the side of the body opposite the slots to prevent fluid flow around the threads and, in addition, force the region of the body near the slot against the housing to provide absolute repeatability of cross-sectional area and hence flow therethrough which is dependent only on the body position longitudinally relative to the housing.

It is an object of this invention to provide an improved variable orifice device.

More particularly, it is an object of this invention to provide a variable orifice device in which the fluid flow through the device is substantially linear and dependent upon longitudinal position of a body within a housing.

It is another object of this invention to provide linearity of flow through a slotted bolt device during each revolution of the bolt relative to a housing in which it is disposed.

It is another object of this invention to provide a variable orifice device utilizing a slot arrangement in which a protrusion is provided on the opposite side thereof to prevent fluid flow around threads and to force the slot against the housing for repeatability and accurate fluid control.

Other and more specific objects of this invention will become apparent as this description proceeds taken in conjunction with the drawings in which:

FIG. 1 is a view partially in cross-section of a slotted bolt according to this invention as it is positioned within a housing for the passage of fluid, FIG. 2 is a perspective view of the slotted bolt according to this invention, FIG. 3 is a side view partially in cross-section of the slotted bolt shown in FIG. 2, FIG. 4 is an end view of the bolt according to this invention as viewed along the lines 4—4 of FIG. 3, FIG. 5 is a graph showing the relationship of flow area and the bolt position or depth in revolutions for an optimumly designed contour slot as compared to a double slot arrangement according to this invention, FIG. 6 is a view partially in cross-section showing the relationship of the countersink angle of the housing and the slot in the body as the body is moved longitudinally relative to the housing, FIG. 7 is another view showing the relationship of the slot angle and the countersink angle and how linearity of flow is improved according to another feature of this invention, and FIG. 8 is a graph illustrating the orifice area versus the number of revolutions of the bolt relative to the housing for both the examples shown in FIG. 6 and FIG. 7.

FIG. 1 is illustrative of one application of this invention. The housing 2 is integrally attached to a line 4 through which fluid flows in the direction of arrow 6. Housing 2 has an outlet 8 through which fluid flows from line 4 as it is diverted through passage 10. A body member 12 is disposed within longitudinal passage 10 for movement axially thereof from a position wherein fluid flow may be completely closed from line 4 through outlet 8, to a position providing maximum flow therebetween. In the embodiment shown, body 12 is threaded and housing 2 has complementary threads so that upon rotation of body 12 relative to housing 2, body 12 may be advanced to the left as shown in FIG. 1 to reduce the flow through outlet 8. Movement to the right will increase the flow therethrough. Although not shown in FIG. 1, a protrusion or insert 50 (see FIG. 3) is provided which is self-tapping and extends longitudinally of the passage. This serves the function of forcing the body 12 against the housing at a point diametrically opposite the insert or protrusion and in addition prevents leakage of fluid around the threads of body 12. Any leakage around the threads has the effect of changing the predicted flow through outlet 8. At 14 a slot is shown which extends from the peripheral surface of body 12 toward the center of body 12. Another slot 16 may be provided which, as explained later, enables the device to be linear throughout full flow to zero flow. An enlarged portion 26 of the passage forms a manifold to allow flow of fluid around body 12. Seal 18 is optionally provided between double heads 12a of body 12 for preventing leakage of fluid past body 12 into cavity 20. Means not shown are provided to rotate body 12 relative to housing 2. This means may comprise a simple manual crank attached to body 12 or more sophisticated motor means.

In operation, fluid will flow in the direction of arrow 6 exiting as shown by arrow 22. A portion of this fluid will enter passage 10 and assuming the slots 16 or 14 are in the proper position, the fluid will flow therethrough to outlet 8 for use as desired as shown in the direction of arrow 24. As the body 12 is moved to the right as viewed in FIG. 1, the slot area increases with a concomitant increase of fluid flow. Although illustrated and described as a control orifice for a by-pass, the valve of this invention can be utilized in a straight flow path to control total flow.

In FIG. 2, body 12 is shown in more detail. Threads 30 provide the means by which body 12 can advance longitudinally of housing 2 when body 12 is rotated relative thereto. Slot 14 commences at the periphery 14a of body 12 and extends inwardly toward the center thereof and includes a base 32 and side walls 34 and 36. Although the slot is illustrated as being substantially rectangular in configuration, it is within the scope of this invention to provide any other geometrical configuration that will accomplish the objects of this invention such as triangular, curvilinear or other shapes. In any event, the term base and sidewalls is considered to include any of these configurations. Slot 16 is formed in a manner similar to slot 14 and extends from 38 as shown and likewise includes a base indicated at 40. Sidewalls 42 and 46 along with base 40 form 3 sides of the slot and in conjunction with the housing form a rectangular flow area. As described with reference to slot 14, slot 16 may likewise assume various shapes as the need arises. Slot 16 is shown as extending from the aforementioned point 38 to an outside periphery 48.

Referring to FIG. 3, a view partially in cross-section of body 12 is shown. Opposite slots 14 and 16 is a longitudinal protuberance 50. This protuberance is an insert which fits into a groove 52 in body 12 as more clearly brought out in FIG. 4. As an example of a material which can be utilized as an insert is nylon. As body 12 is initially screwed into housing 2, the nylon insert will be engaged by the threads in housing 2 and indentations in the insert will be formed. Accordingly, the insert is self-tapping. This serves several functions. One of them is to compensate for any tolerances between the threads of body 12 and the threads of housing 2 so that a tight fit is assured. More important, however, is that by placing this insert or protuberance at 180 degrees to or diametrically opposite from slots 14 and 16, the body 12 will be urged in a direction toward the slots so that a tight fitting will result between the region of body 12 adjacent or near the slots and the housing, thus assuring a constant or repeatable cross-sectional orifice depending on the location longitudinally of the body 12 relative to housing 2. In addition, since it is desirable to have repeatable and controlled flow through the orifices formed by the slots and the housing, there should be no leakage flow around threads 30. Protuberance or insert 50 prevents this leakage since any flow tending to flow around the threads is stopped by insert 50 which acts as a barrier. Although the preferred position of the slot is at the diametrically opposed point from the protuberance, the protuberance can be at other angles for leakage control.

FIG. 5 is a graph of bolt depth in complete revolutions and orifice area as determined by the cross-sectional area of the slot and the housing. For clarity, the orifice is not dimensioned. The minimum area bounded by either slot 14 or 16 and the housing will naturally determine the orifice. The ideal condition under which linear flow can be accomplished in a slotted bolt is to contour the slot in the bolt. That is to say, for each revolution of the bolt, to obtain linearity of flow versus revolutions, it is necessary that the slot be contoured, i.e., curved longitudinally. However, machining problems are great in forming such a slot. Accordingly, it is desirable if at all possible to obtain this linearity by machining straight grooves. This is accomplished in the instant invention by providing the two slots shown in FIGS. 1–3. By plotting the ideal longitudinal contour slot in a graph of orifice area versus bolt depth in revolutions, it is possible to approximate the ideal condition by two straight slots. As shown in FIG. 5, the ideal situation is illustrated as 60 and represents the contoured slot of flow area revolutions, while line 62 represents slot 16 and line 64 represents slot 14 which is a relatively close approximation to the ideal condition. Thus it can be seen that by the use of two different angled slots, the optimum condition represented by a contoured slot can be approximated. It is also within the scope of this invention to provide 3 or more slots to obtain an even closer approximation. If desired, a plurality of circumferential slots can be provided.

In addition to the desirability of having linear flow as plotted by revolutions, it is also desirable to have linearity of flow from the beginning of each revolution of bolt 12 relative to housing 2 to the end of that particular revolution. It has been found that if the housing 2 is countersunk at 26a at a given angle, and the slot 14, for example, is at a given angle, linearity of flow as between the beginning of a revolution and the end of the same revolution will not occur if the countersink angle is greater than the slot angle. This is more clearly brought out in FIG. 6. Housing 2, at one end thereof, has a face 70 and threads 72 which are engaged by threads 30 of body 12 but are not shown in FIG. 6. A standard countersink which also facilitates the insertion of bolt 12 into housing 2 is shown which is represented by angle B and for purposes of explanation is assumed to be 45 degrees. Angle A represents the slot angle of slot 14 relative to the longitudinal passage and in the example given is assumed to be 15 degrees. When this occurs, it has been found that as between the beginning of each revolution and the end thereof, a non-linearity of flow results which is graphically illustrated in FIG. 8 by line 74. Linearity of flow which is accomplished by the teachings of this feature of the invention is represented by 76. Turning again to FIG. 6, the orifice height is represented by H at a given position which is assumed to be the beginning of a given revolution. Should the countersink angle be greater than the slot angle, the following will occur. At 90 degrees of revolution, the next tooth in line which is shown at 78 will move into position. For purposes of clarity this is shown as the housing rotated relative to body 12 rather than rotation of the body relative to the housing. At position 0 (or beginning of revolution), tooth 78 will be at position 80. After a 90 degree revolution, tooth 78 will move into position 82. It can be seen that the orifice height is still shown at H so that even after 90 degree revolution, there is no change in orifice size and hence the fluid flow will remain constant. At 180 degrees, the tooth 78 will be in position 84 and again there is no change in fluid flow. Finally, after 270 degrees revolution, the tooth will be in position 86 and it can be seen that by this 90 degree revolution, most of the change of flow as between the beginning of the revolution and the total 360 degree revolution will be most effective. Finally, after 360 degrees, tooth 78 will be in position 88 and the process will repeat itself upon further revolution. This is graphically illustrated in FIG. 8 in which from 0 to 0.50 (180 degrees) revolutions, there is no change in orifice area. The greatest change in orifice area occurs between 0.50 and 0.75 revolution (270 degrees) with a small change represented by the final 90 degree revolution from 0.50 to 1.00 revolution (360 degrees).

In contrast, by making angle B for the countersink angle B equal to or less than slot angle A, a linearity of flow from the beginning of each revolution to the end of each revolution occurs. As shown in dotted lines, as housing 2 and body 12 move longitudinally relative to each other, the tooth which determines the orifice gradually moves into position cutting down (or increasing) the orifice height H and when the tooth is no longer controlling, the next tooth will have just begun to likewise control the orifice area which results in a linearity of flow as represented by line 76 in FIG. 8.

Thus, it can be seen that by the teachings of this invention, linearity of flow through a variable orifice is accomplished with repeatability of results and extreme accuracy and predictability.

Various embodiments of the present invention, in addition to what has been illustrated and described in detail, may be employed without departing from the scope of the accompanying claims.

I claim:
1. A variable orifice device comprising;
   a housing having an inlet, an outlet and a longitudinal passage therethrough for allowing fluid flow,
   a body disposed within said passage and adapted to move longitudinally in said passage, a first longitudinally extending slot of constant width in said body, said first slot having a base which extends from the surface of said body toward and terminating at a point short of the center of said body and at a first acute angle to the longitudinal passage, said first slot and said housing forming a first orifice between the inlet and outlet of said passage whereby as said body is moved longitudinally in said housing, said first orifice is varied in size, and
   a second slot of constant width longitudinally extending in said body, said second slot having a base which extends from said first slot toward a surface of said body at a second acute angle to the longitudinal passage, said second slot and said housing forming a second orifice between the inlet and outlet of said passage so that when said body is moved longitudinally in said housing said second orifice is varied in size, the angle of said first slot being at least equal to the angle of said second slot whereby the cross-sectional areas and acute angles of said slots are arranged such that the ratio of flow through said orifices and the longitudinal position of said body is substantially linear.

2. A variable orifice device according to claim 1 in which said first and second slots lie in the same plane.

3. A variable orifice device according to claim 2 in which said housing is formed with internal threads and said body is formed with complementary external threads that are co-extensive with said slots whereby said body is adapted to move longitudinally relative to said passage by rotating said body relative to said housing.

4. A variable orifice device according to claim 3 in which said body is eccentric with respect to said longitudinal passage and has a self-tapping, longitudinally extending protrusion thereon.

5. A variable orifice device according to claim 4 in which said protrusion lies on the opposite side of said body and in the same plane as said slots whereby said body is forced against said housing in the region of said slots.

6. A variable orifice device comprising;
   a housing having an inlet, an outlet and a passage for allowing the flow of fluid therethrough,
   a body disposed within said passage, said body and passage each having complementary threads whereby when said body is rotated relative to said housing, said body will move longitudinally of said passage, said body having at least one slot formed therein, said slot having a base and side walls, said base extending inwardly from the surface of said body whereby a variable orifice is formed by the base, side walls and housing as said body and housing are rotated relative to each other, said body further having a self-tapping longitudinally extending protrusion located diametrically opposite said slot to force said body against said housing in the region of said slot, whereby leakage around said threads is prevented.

7. A variable orifice device comprising;
   a housing having an inlet, an outlet and a longitudinally extending passage for allowing the flow of fluid therethrough,
   a body disposed within said passage, said body and passage each having complementary threads to allow relative longitudinal movement of said body when said body is rotated relative to said housing, said body having at least one slot formed therein, said slot having a base and side walls, said base extending inwardly at an acute angle to the passage from the surface of said body whereby a variable orifice is formed by the base, side walls and housing as said body and housing are rotated relative to each other, said base extending inwardly at an acute angle A to the longitudinally extending passage, said housing passage being threaded throughout its length, one end thereof having a countersink to facilitate entry of said body, said countersink and said longitudinally extending passage forming an acute angle B, the angle A being at least equal to angle B.

8. A variable orifice device according to claim 7 in which angle A is greater than angle B.

9. A variable orifice device according to claim 7 wherein said body has a second slot having a base and side walls, said base extending from the base of the first slot toward a surface of said body at a second acute angle to the passage, said second slot and said housing forming a second orifice between the inlet and outlet,
   whereby as said body is moved longitudinally in said housing, said second orifice is varied in size, the cross-sectional areas and acute angles of said slots being arranged such that the ratio of flow through said orifices and the longitudinal position of said body relative to said housing is substantially linear.

10. A variable orifice device according to claim 9 in which said first and second slots lie in the same plane and wherein said body has a self-tapping longitudinal protrusion diametrically opposite said slots and in the same plane as said slots whereby said body is forced against said housing in the region of said slots.

11. A variable orifice device comprising;
   a housing having an inlet, an outlet and a longitudinal passage therethrough for allowing fluid flow,
   a body disposed within said passage and adapted to move longitudinally in said passage, a first longitudinally extended slot in said body, said first slot having a base which extends from the surface of said body toward the center of said body and at a first acute angle to the longitudinal passage, said first slot and said housing forming a first orifice between the inlet and outlet of said passage whereby as said body is moved longitudinally in said housing, said first orifice is varied in size, a second slot longitudinally extending in said body, said second slot having a base which extends from the base of said first slot toward a surface of said body at a second acute angle to the longitudinal passage, said second slot and said housing forming a second orifice between the inlet and outlet of said passage whereby when said body is moved longitudinally in said passage said second orifice is varied in size, the cross-sectional areas and acute angles of said slots being arranged such that the ratio of flow through said orifices and the longitudinal position of said body is substantially linear, said first and second slots lying in the same plane, said body and said housing having complementary threads formed thereon whereby said body is adapted to move longitudinally relative to said passage when said body is rotated relative to said housing, a self-tapping, longitudinally extending protrusion on said body, said protrusion lying in the same plane as said slots and diametrically opposite thereto, said housing having a countersink at one end thereof, said countersink and said longitudinally extending passage forming an acute angle B, one of said slots extending at an acute angle A to said longitudinal passage, the angle A being equal to or greater than angle B.

References Cited

UNITED STATES PATENTS

| | | | |
|---|---|---|---|
| 401,576 | 4/1889 | Murphy et al. | 251—122 X |
| 1,966,294 | 7/1934 | Goslee | 251—122 X |
| 2,409,638 | 10/1946 | Lyon | 151—7 |
| 2,516,825 | 7/1950 | Hejduk | 251—122 |
| 2,852,056 | 9/1958 | Rapata | 151—7 |
| 3,263,726 | 8/1966 | McKay | 151—7 |

M. CARY NELSON, *Primary Examiner.*

R. C. MILLER, *Assistant Examiner.*